United States Patent
Hily et al.

(10) Patent No.: US 7,640,419 B2
(45) Date of Patent: Dec. 29, 2009

(54) METHOD FOR AND A TRAILING STORE BUFFER FOR USE IN MEMORY RENAMING

(75) Inventors: Sebastien Hily, Hillsboro, OR (US); Per H. Hammarlund, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 175 days.

(21) Appl. No.: 10/743,422

(22) Filed: Dec. 23, 2003

(65) Prior Publication Data

US 2005/0138339 A1 Jun. 23, 2005

(51) Int. Cl.
*G06F 9/30* (2006.01)
(52) U.S. Cl. .................................. 712/218
(58) Field of Classification Search .................. None
See application file for complete search history.

(56) References Cited

U.S. PATENT DOCUMENTS

| | | | | |
|---|---|---|---|---|
| 5,751,983 A | * | 5/1998 | Abramson et al. | 712/216 |
| 6,065,103 A | * | 5/2000 | Tran et al. | 711/156 |
| 6,233,657 B1 | * | 5/2001 | Ramagopal et al. | 711/146 |
| 6,360,314 B1 | * | 3/2002 | Webb et al. | 712/219 |
| 6,675,287 B1 | * | 1/2004 | Gaskins et al. | 712/216 |
| 6,687,809 B2 | * | 2/2004 | Chowdhury et al. | 712/216 |
| 6,918,030 B2 | * | 7/2005 | Johnson | 712/225 |

* cited by examiner

*Primary Examiner*—Eddie P Chan
*Assistant Examiner*—Jacob Petranek
(74) *Attorney, Agent, or Firm*—Kenyon & Kenyon LLP

(57) ABSTRACT

Embodiments of the present invention relate to a memory management scheme and apparatus that enables efficient memory renaming. The method includes computing a store address, writing the store address in a first storage, writing data associated with the store address to a memory, and de-allocating the store address from the first storage, allocating the store address in a second storage, predicting a load instruction to be memory renamed, computing a load store source index, computing a load address, disambiguating the memory renamed load instruction, and retiring the memory renamed load instruction, if the store instruction is still allocated in at least one of the first storage and the second storage and should have effectively provided to the load the full data. The method may also include re-executing the load instruction without memory renaming, if the store instruction is not in at the first storage or in the second storage.

27 Claims, 4 Drawing Sheets

METHOD FOR AND A TRAILING STORE BUFFER FOR USE IN MEMORY RENAMING

FIELD OF THE INVENTION

Embodiments of the present invention relate to high-performance processors, and more specifically, to a memory management scheme and apparatus that enables efficient memory renaming.

BACKGROUND

Most instructions in a computer instruction set operate on several source operands to generate results. The instructions name, either explicitly or through an indirection, the source and destination locations where values are read from or written to. A name may be either a logical, or architectural, register or a location in memory.

Instructions involving register operands are faster than those involving memory operands. For some microprocessor architectures, instructions naming memory operands are translated, or decoded, into micro-instructions that transfer operand values from memory to logical registers and then perform the decoded computations. The number of logical registers, however, often is limited, and, as a result, compilers should efficiently utilize logical registers to generate efficient code.

The number of physical registers available in a microprocessor typically exceeds the number of logical registers, so that register renaming may be utilized to increase performance. In particular, for out-of-order processors, register renaming allows instructions to be executed out of their original program order. Thus, for many out-of-order processors, an instruction is renamed so that logical registers named in the original instruction are renamed to physical registers.

Renaming a logical register involves mapping a logical register to a physical register. These mappings are stored in a Register Alias Table ("RAT"). A RAT maintains the latest mapping for each logical register. A RAT is indexed by logical registers, and provides mappings to corresponding physical registers. This activity may be called dependency tracking.

FIG. 1 depicts a register renaming and dependency tracking scheme involving three structures: RAT 110, active list 102, and free list 104. For each logical register specified by a renamed instruction, an unused physical register from free list 104 is allocated. RAT 110 is updated with this new allocation. Physical registers are free to be used again, or reclaimed, once they cannot be referenced by instructions in the current instruction window.

Based upon the data structures depicted in FIG. 1, one method for register reclaiming is to reclaim a physical register when the instruction that evicted it from RAT 110 retires. Thus, the instruction that created the new allocation to the physical register is retired. As a result, whenever a new allocation updates RAT 110, the evicted old allocation is pushed into active list 102. An active list 102 entry is associated with each instruction in the instruction window. When an instruction retires, the physical register of the old allocation recorded in active list 102, if any, is reclaimed and pushed into free list 104. The cycle is depicted in FIG. 1.

A scheme known as "result reuse" may be used to optimize the above-discussed process. Result reuse transforms the internal representation of the data-flow graph to significantly increase the level of instruction-level parallelism. Prior to renaming, whenever the result of an instruction is recognized to match the result of another instruction, the same physical register is used for both instructions. This scheme redirects all dependencies on both instructions towards the instruction that dynamically executes first. Result reuse relies on value-identity detectors. The detector outcome can be either safe or speculative. An example of a safe detector outcome is one directed to move instructions. Using value-identity detection, a move instruction can be completely eliminated from the execution stream. In such a case, it is safe to reallocate the physical register holding the source value because, by definition, the source and destination values are identical. An example of a speculative detector outcome is one directed to memory bypassing. Load instructions often collide with older store instructions in the instruction window of a processor. In such cases, the result of the load instruction is identical to the result that was stored in memory by the colliding store instruction. Predicting such value-identities for load instructions makes it possible to bypass memory accesses completely.

For any incoming instruction, the value-identity prediction structures may predict the location in the instruction window, or anywhere in the physical register space, of another instruction that produces the same result. In this case, the physical register allocated to this older instruction is retrieved from the instruction window, and reallocated for the incoming instruction.

The value identity predictor includes three parts. The first part establishes a potential identity relation between a pair of instructions. The second and third parts record and retrieve this value identity relation into/from the prediction structures. While general methods and structures exist for implementing the second and third parts, the first part typically is done by an assortment of ad hoc methods for establishing the value identity.

For many instructions belonging to the Intel® Architecture 32-bit (IA-32) instruction set (Intel® is a registered trademark of Intel Corporation, Santa Clara, Calif.), one of the source registers is also used as the destination register. If the value stored in this source register is needed by subsequent (in program order) instructions, a register-move instruction may be inserted prior to the subsequent instruction to copy the source operand in the source register to another logical location so that it can be accessed by the subsequent instruction. (IA-32 moves instructions operating on memory operands are considered load or store instructions.)

Another reason for the insertion of register-move instructions in IA-32 code is to set the parameter values in the appropriate registers prior to a procedure call. The IA-32 Application Binary Interface (ABI) requires parameters for a procedure call to be passed on the stack. However, compilers often use alternate, non-standard, register-based parameter passing, when possible. For RISC instruction set architecture machines, register-move instructions are mainly used for parameter passing.

As a result, the number of register-move instructions may be quite significant in typical IA-32 programs, as well as for programs written for other processor architectures. Therefore, there is a need for the efficient execution of register-move instructions with efficient register renaming and reclaiming schemes.

DETAILED DESCRIPTION

Embodiments of the present invention relate to an apparatus and a method for implementing memory renaming, which includes, but is not limited to, a load memory renaming where a load is predicted to forward from a previous store to obtain its data. Similarly, subsequent instructions and/or operations that are dependent on the load may be permitted to obtain their data from the operation that generated the input to the store. When a load is predicted to be memory renamed to a previous store the prediction needs to be checked, that is, the memory renamed load is disambiguated, to determine whether the store is still in a memory ordering buffer ("MOB") when the memory renamed load retires. However, since the memory renaming prediction occurs in the front-end of the processor, data consumption occurs early in the execution pipeline and the memory renamed load is not checked against the stores in the processor until the end of the execution pipeline, it is possible that the store to which the memory renamed load was predicted to forward from may have been de-allocated from the MOB. If the store has been deallocated, checking cannot be done and the memory renamed load must re-execute even if it was correct.

Embodiments of the present invention may be used when the store to which the memory renamed load was predicted to forward from has been de-allocated from the MOB. In accordance with an embodiment of the present invention, a trailing store buffer (TSB) may be used to maintain information from the stores that have been de-allocated from the MOB when the memory renamed load disambiguates. A generation number or color may be associated with the store information so that the memory renamed loads do not hit on younger allocated stores (that is, stores that executed subsequent to the memory renamed load). In accordance with embodiments of the present invention, the TSB may store information for all stores that are de-allocate from the MOB or only for those stores that have memory renamed loads associated with them.

Figure 1:
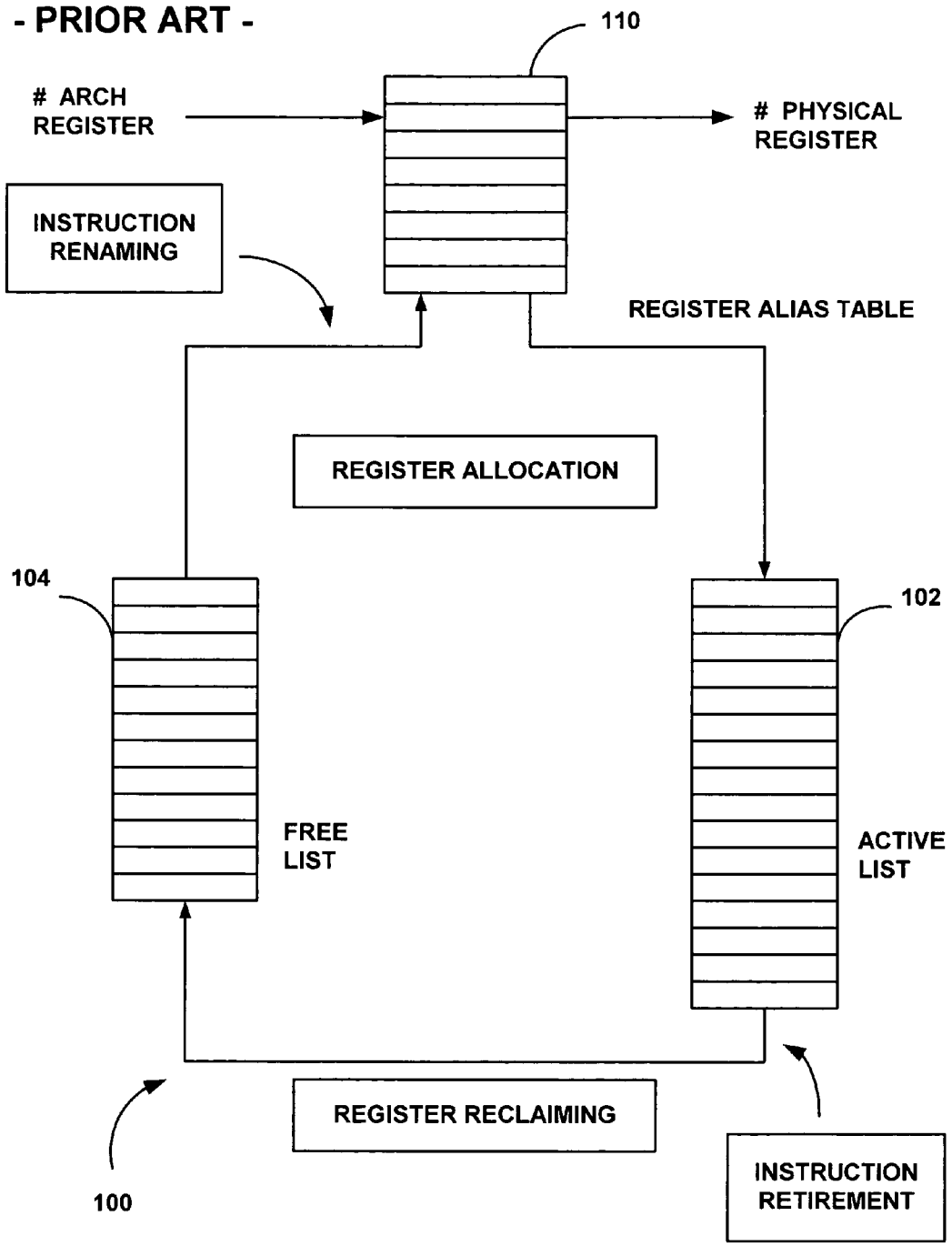
FIG. 1 is a system for register reallocation as known in the art.
Figure 2:
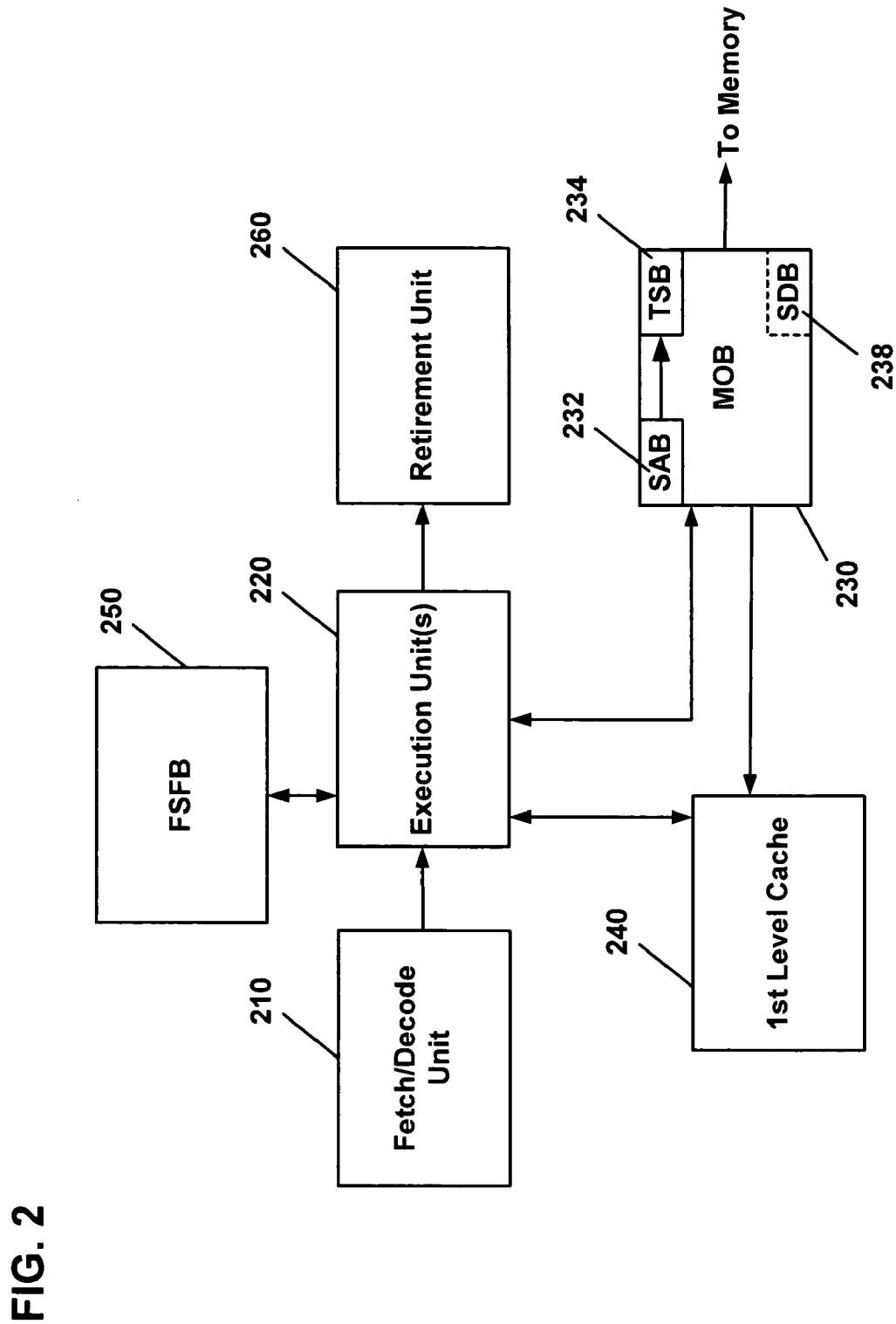
FIG. 2 is an out-of-order processor including a system for memory renaming constructed according to an embodiment of the present invention.

Embodiments of the present invention may be described by referring to an out-of-order processor 200, depicted in FIG. 2. Not all functional units of processor 200 are depicted in FIG. 2. A fetch/decode unit 210 may fetch instructions from a storage location, for example, an instruction cache (not shown), and may decode the instructions. For a Complex Instruction Set Computer ("CISC") architecture, fetch/decode unit 210 may decode a complex instruction into one or more micro-instructions/operations. Usually, these micro-instructions define a load-store type architecture, so that micro-instructions involving memory operations may be practiced for other architectures, such as Reduced Instruction Set Computer ("RISC") or Very Large Instruction Word ("VLIW") architectures.

In a RISC architecture, instructions are not decoded into micro-instructions. Because the present invention may be practiced for RISC architectures as well as CISC architectures, no distinction is made between instructions and micro-instructions/operations unless otherwise stated, and simply refer to these as instructions.

In FIG. 2, in accordance with an embodiment of the present invention, fetch/decode unit 210 may be coupled to one or more execution units 220, which may be coupled to a memory ordering buffer ("MOB") 230. MOB 230 may be coupled to a longer term memory, for example, a cache memory, a random access memory (RAM), a dynamic RAM (DRAM), and the like. MOB 230 may include a store address buffer ("SAB") 232, a trailing store buffer ("TSB") 234 and a store data buffer ("SDB") 238. In other embodiments, some or all of SAB 232, TSB 234 and SDB 238 may be implemented separate of, but still coupled to, MOB 230. Execution unit 220 may also be coupled to and a retirement unit 260.

In FIG. 2, in accordance with an embodiment of the present invention, SAB 232 may be used to maintain information related to the store instruction and SDB 238 may be used to maintain data from the store instruction. This information may include a store address for the data of the store instruction, a store type, etc. A store buffer identification ("SBID") may also be associated with the store instruction. An SBID is, generally, associated with a store instruction in-order, that is, after the store instruction is fetched/decoded but before it is executed. The SBID generally points directly to the store entry in SAB 232 and SDB 238. In addition, a tail pointer may be implemented in SAB 232 to point to the oldest store instruction in SAB 232. A wrap-around bit may also be associated with SAB 232 that may be toggled each time all of the SBIDs have been allocated, which may help keep track of the relative age of each store instruction in SAB 232. Thus, the SBID may be used to ensure the proper "age-ordering" of the store instruction in relation to all other currently active store instructions.

As such, the SBID's are allocated in-order and are not available to be reused until they have been de-allocated from processor 200. The SBIDs are generally always used in age-order to ensure the proper execution order of the instructions. In an embodiment of the present invention, the SBIDs may be implemented in a limited number, for example, 0 through 31, using a sequential order with wrap-around. Unfortunately, when all of the SBIDs have been allocated, the front-end of the processor may be stalled until some of the SBIDs become available. A store information entry in SAB 232 may be de-allocated when the associated data in SDB 238 is written out to memory. The SBID for the de-allocated store information may be returned to be reused, if the store information has not also been stored in TSB 234. The store information for the store instruction, including the SBID, may be written directly from SAB 232 to TSB 234.

In FIG. 2, in accordance with an embodiment of the present invention, TSB 234 may be used to maintain the store information of the de-allocated store until the data associated with the de-allocated store in the physical register is overwritten or corrupted. The store information may be written to TSB 234 when the store information is deallocated from SAB 232 or, alternatively, at deallocation but only when the store was a source of memory renaming. In another embodiment of the present invention, TSB 234 may be external, but still coupled to MOB 230.

In FIG. 2, in accordance with an embodiment of the present invention, SDB 238 may be located external to MOB 230 and may also be internal to MOB 230, as shown in FIG. 2. Regardless of where SDB 238 is located, it has a one-to-one correlation with the store information in SAB 232 to ensure the store addresses are always associated with the correct store data. The store address for the store instruction, and eventually all or part of the SBID, may be written directly from SAB 232 to TSB 234.

A load instruction moves the value held in a memory location into a logical register. If it happens that the load instruction in the instruction window accesses the same memory location as an older store instruction, and if there is no other intervening store instruction (or snoop) for the same memory location, the load instruction may use the same register location as the older store instruction. In general, the load instruction is associated with the "youngest of the older stores" currently active in processor 200. A detection system, such as one known in the art, may be used to predict or ascertain such a load instruction in the code. The result reuse scheme may be applied to eliminate the load having to retrieve the data from memory external to processor 200, for example, DRAM. Performance may be increased because latency of the load should not be incurred and the load memory traffic to memory is reduced. The load latencies associated with the different types of memory may be, for example, about 4 cycles for a first level cache memory, about 300 to 400 cycles for DRAM, but only 1 cycle for a register. Embodiments of the present invention speculate on such events to perform result reuse for load instructions from memory.

Whenever it is determined or predicted that a load may access the same location as an older store, without an intervening store or snoop to this location, result reuse may re-allocate the physical register that has already been allocated to the store to the load. Multiple mappings may be possible and may indicate that more than one logical register may be mapped to the same physical register. Effectively, such load instructions are performed during the renaming stage. Dependency graphs are collapsed because instructions that are dependent on such load instructions are made dependent directly on the real producer, such that the dependencies are redirected. There also may be a reduction in the requirement for physical registers, and there may be fewer writes into the register file.

Figure 3:
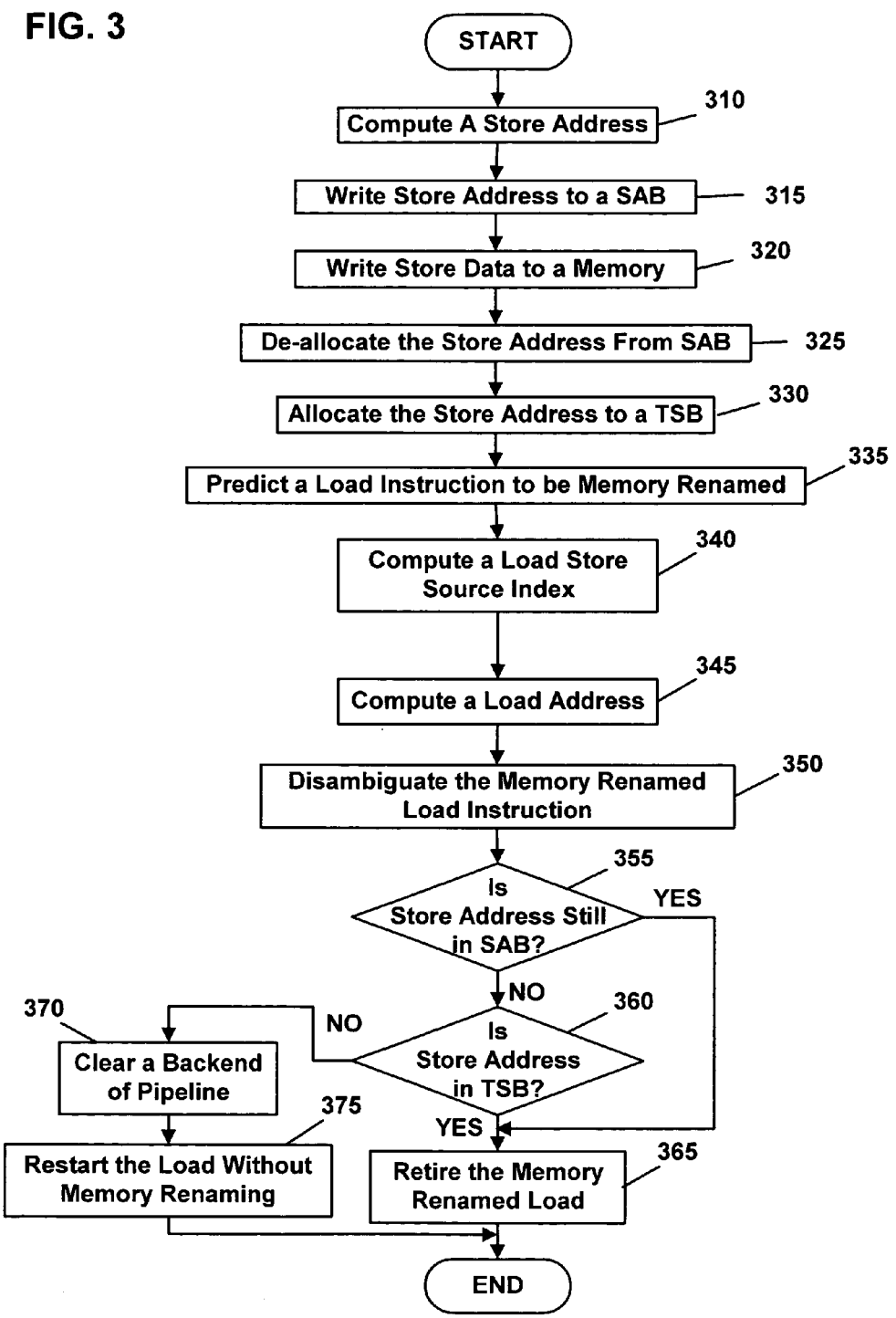
FIG. 3 is a flow diagram of a method according to an embodiment of the present invention.

FIG. 3 is a flow diagram of a method in accordance with an embodiment of the present invention. In FIG. 3, an address for a store instruction may be computed (310) in processor 200 and the store address, of for example, a register, and a SBID for the store instruction, may be written (315) to SAB 232 in, for example, MOB 230, for temporary storage. Data from the store may be written (320) to a memory, for example, a long term memory such as a random access memory and/or a mass memory disk storage system (not shown) and the store address may be de-allocated (325) from SAB 232 and the store address may be allocated (330) to TSB 234.

In FIG. 3, processor 200 may predict (335) a load instruction to be memory renamed to use the same register as a previous instruction, for example, the above store instruction that was written (315) into SAB 232. A load store source index, for example, a SBID, may be computed (340) and a load address, for example, a register address, may also be computed (345) in processor 200 to be the same as the above store instruction (e.g., a source store instruction) and may be used by the load instruction to obtain its data. The memory renamed load instruction may be disambiguated (350) that is a check may be performed to see if the load instruction used the correct data. However, since the store address (e.g., a source store address) is de-allocated from MOB 230 upon completion of the store instruction, disambiguating (350) the memory renamed load instruction may result in the store instruction from which the load instruction was forwarded not being in MOB 230. In accordance with this embodiment of the present invention, disambiguating (350) the memory renamed load instruction may include checking SAB 232 to determine whether the store address is still in SAB 232 and, if the store address is not in SAB 232, determining whether the store address is in TSB 234. If the store address is determined (355) to still be in SAB 232 and/or the store address is determined (360) to be in TSB 234, the memory renamed load instruction may be able to be checked against the store instruction to verify that the memory renaming was correct, if the memory renaming was correct, that is, if the full data of the load instruction should have been provided by the predicted store instruction, the load instruction may be retired (365) and the method may terminate.

However, in FIG. 3, if the store address is not determined (355) to still be in SAB 232 and the store address is not determined (360) to still be in TSB 234, the load instruction cannot be checked against any store instruction to check the correctness of the memory renaming, so the memory renaming must conservatively be invalidated and a backend of a pipeline in processor 200 may be cleared (370) and the load instruction may be restarted (375) without memory renaming and the method may terminate. One of the advantages of the TSB, compared, for example, to just increasing the size of the SAB, is that the TSB needs to be checked only for memory renamed load instructions. As a result, the SAB may be small, which is essential for fast disambiguation of all of the load instructions to achieve high performance.

In FIG. 3, although the elements are shown to suggest that they execute in the indicated order, the elements may actually execute concurrently with each other and/or in random order. The only timing requirement for the present embodiment of the invention is that the store instruction is "older" than, that is, it began executing before, the load instruction that has been memory renamed to the store instruction.

Figure 4:
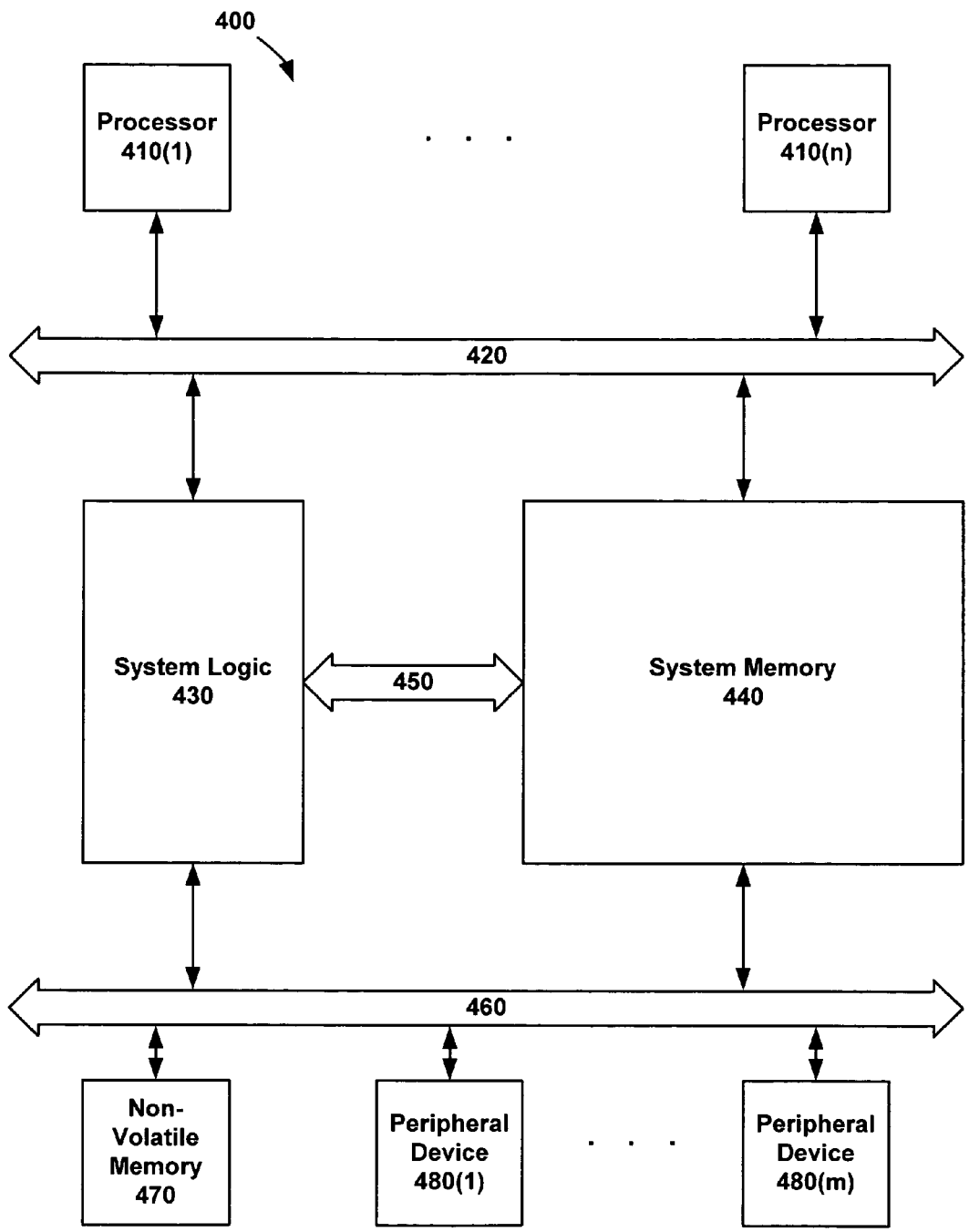
FIG. 4 is a block diagram of a computer system, which includes one or more processors and memory for use in accordance with an embodiment of the present invention.

FIG. 4 is a block diagram of a computer system, which may include an architectural state, including one or more processors and memory for use in accordance with an embodiment of the present invention. In FIG. 4, a computer system 400 may include one or more processors 410(1)-410(n) coupled to a processor bus 420, which may be coupled to a system logic 430. Each of the one or more processors 410(1)-410(n) may be N-bit processors and may include a decoder (not shown) and one or more N-bit registers (not shown). System logic 430 may be coupled to a system memory 440 through a bus 450 and coupled to a non-volatile memory 470 and one or more peripheral devices 480(1)-480(m) through a peripheral bus 460. Peripheral bus 460 may represent, for example, one or more Peripheral Component Interconnect (PCI) buses, PCI Special Interest Group (SIG) PCI Local Bus Specification, Revision 2.2., published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripherable buses. Non-volatile memory 470 may be a static memory device such as a read only memory (ROM) or a flash memory. Peripheral devices 480(1)-480(m) may include, for example, a keyboard; a mouse or other pointing devices; mass storage devices such as hard disk drives, compact disc (CD) drives, optical disks, and digital video disc (DVD) drives; diplays and the like.

Although the present invention has been disclosed in detail, it should be understood that various changes, substitutions, and alterations may be made herein. Moreover, although software and hardware are described to control certain functions, such functions can be performed using either software, hardware or a combination of software and hardware, as is well known in the art. Likewise, in the claims below, the term "instruction" may encompass an instruction in a RISC architecture or an instruction in a CISC architecture, as well as instructions used in other computer architectures. Other examples are readily ascertainable by one skilled in the art and may be made without departing from the spirit and scope of the present invention as defined by the following claims.

What is claimed is:

1. A processor comprising:
   a decoder to decode a load instruction, said load instruction to be memory renamed to use an address of a previous store instruction;
   a memory ordering buffer to maintain the address for the previous store instruction, wherein the address for the previous store instruction is to be de-allocated from the memory ordering buffer after completion of the previous store instruction;
   a trailing store buffer to maintain an address for said previous store instruction in response to said previous store instruction being de-allocated from said memory ordering buffer and only if said previous store instruction being a source of memory renaming, said trailing store buffer to maintain the address for said previous store instruction to disambiguate said load instruction.

2. The processor of claim 1 wherein said memory ordering buffer further comprises:
   a store address buffer to maintain the address for said previous store instruction.

3. The processor of claim 1 wherein said memory ordering buffer further comprises:
   a store data buffer to maintain data associated with said previous store instruction.

4. The processor of claim 1 further comprising:
   a store data buffer coupled to said memory ordering buffer.

5. The processor of claim 1 wherein said trailing store buffer is coupled to said memory ordering buffer.

6. The processor of claim 1 wherein said memory ordering buffer comprises said trailing store buffer.

7. A method comprising:
   computing a store address for a store instruction;
   writing the store address in a first storage;
   writing data associated with the store address to a memory;
   de-allocating the store address from the first storage after completion of the store instruction;
   allocating the store address in a second storage after de-allocating the store address from the first storage only if the store instruction being a source of memory renaming;
   predicting a load instruction to be memory renamed;
   computing a load store source index;
   computing a load address;
   disambiguating the memory renamed load instruction by determining whether the store address is still stored in the first storage and, if not, determining whether the store address is stored in the second storage; and
   retiring the memory renamed load instruction, if the store address is still allocated in at least one of said first storage and said second storage.

8. The method of claim 7 wherein computing a store address comprises:
   computing an address for a store instruction.

9. The method of claim 7 wherein writing the store address in a first storage comprises:
   writing the store address in a store address buffer.

10. The method of claim 9 wherein writing data associated with the store address to a memory comprises:
    writing the data from a store data buffer to said memory using the store address in said store address buffer.

11. The method of claim 10 wherein said store data buffer is in the first storage.

12. The method of claim 10 wherein said store data buffer is external to the first storage.

13. The method of claim 7 wherein de-allocating the store address from the first storage comprises:
    de-allocating the store address from a store address buffer in the first storage.

14. The method of claim 7 further comprises:
    determining whether said store address for the memory renamed load instruction is in the second storage.

15. The method of claim 7 further comprising:
    clearing a backend of a processor and restarting the load instruction without memory renaming, if said store address has been de-allocated from said first storage and said second storage.

16. A machine-readable medium having stored thereon a plurality of executable instructions to perform a method comprising:
    computing a store address for a store instruction;
    writing the store address in a first storage;
    writing data associated with the store address to a memory;
    de-allocating the store address from the first storage after completion of the store instruction;
    allocating the store address in a second storage after de-allocating the store address from the first storage only if the store being a source of memory renaming;
    predicting a load instruction to be memory renamed;
    computing a load store source index;
    computing a load address;
    disambiguating the memory renamed load instruction by determining whether the store address is still stored in the first storage and, if not, determining whether the store address is stored in the second storage; and
    retiring the memory renamed load instruction, if the store address is still allocated in at least one of said first storage and said second storage.

17. The machine-readable medium of claim 16 wherein computing a store address comprises:
    computing an address for a store instruction.

18. The machine-readable medium of claim 16 wherein writing the store address in a first storage comprises:
    writing the store address in a store address buffer.

19. The machine-readable medium of claim 18 wherein writing data associated with the store address to a memory comprises:
    writing the data from a store data buffer to said memory using the store address in said store address buffer.

20. The machine-readable medium of claim 19 wherein said store data buffer is in the first storage.

21. The machine-readable medium of claim 19 wherein said store data buffer is external to the first storage.

22. The machine-readable medium of claim 16 wherein deallocating the store address from the first storage comprises:
    de-allocating the store address from a store address buffer in the first storage.

23. The machine-readable medium of claim 16 further comprises:
    determining whether said store address for the memory renamed load instruction is in the second storage.

24. The machine-readable medium of claim 16 further comprising:
    clearing a backend of a processor and restarting the load instruction without memory renaming, if said store address has been de-allocated from said first storage and said second storage.

25. A computer system comprising:
    a processor comprising:
    a decoder to decode a load instruction naming a destination register;

a memory ordering buffer to maintain an address for a store instruction, wherein the address for the store instruction is to be de-allocated from the memory ordering buffer after completion of the store instruction; and a trailing store buffer to maintain an address for said store instruction in response to said store instruction being de-allocated from said memory ordering buffer and only if said store instruction being a source of memory renaming, said trailing store buffer to maintain the address for said store instruction to disambiguate said load instruction; and a memory coupled to said processor.

26. The computer system of claim 25 wherein said memory ordering buffer further comprises:

a store address buffer to maintain an address for said store instruction.

27. The computer system of claim 25 wherein said memory ordering buffer further comprises:

a store data buffer to maintain data associated with said store instruction.

* * * * *

UNITED STATES PATENT AND TRADEMARK OFFICE
CERTIFICATE OF CORRECTION

PATENT NO. : 7,640,419 B2 Page 1 of 1
APPLICATION NO. : 10/743422
DATED : December 29, 2009
INVENTOR(S) : Hily et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 353 days.

Signed and Sealed this

Twenty-first Day of December, 2010

David J. Kappos
*Director of the United States Patent and Trademark Office*